United States Patent
Song et al.

(10) Patent No.: US 12,360,612 B2
(45) Date of Patent: Jul. 15, 2025

(54) OPTICAL NAVIGATION DEVICE AND METHOD CAPABLE OF ACCURATELY AVOIDING STATIONARY CURSOR JITTER NOISE

(71) Applicant: PixArt Imaging Inc., Hsin-Chu (TW)

(72) Inventors: Willie Song, Penang (MY); Siew Chin Lee, Penang (MY)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

(21) Appl. No.: 18/533,205

(22) Filed: Dec. 8, 2023

(65) Prior Publication Data

US 2025/0190060 A1   Jun. 12, 2025

(51) Int. Cl.
*G06F 3/03* (2006.01)
*G06F 3/0354* (2013.01)
*G06F 3/038* (2013.01)

(52) U.S. Cl.
CPC ........ *G06F 3/0308* (2013.01); *G06F 3/03543* (2013.01); *G06F 3/038* (2013.01)

(58) Field of Classification Search
None
See application file for complete search history.

(56) References Cited

U.S. PATENT DOCUMENTS

| | | | | |
|---|---|---|---|---|
| 6,831,628 B1* | 12/2004 | Farag | ..................... | G06F 3/0421 345/157 |
| 7,230,606 B2* | 6/2007 | Ahn | ..................... | G06F 3/0317 250/221 |
| 7,444,006 B2* | 10/2008 | Lin | ..................... | G06T 7/20 356/28 |
| 11,921,940 B1* | 3/2024 | Chen | ..................... | G06F 3/0383 |
| 12,039,111 B1* | 7/2024 | Leong | ..................... | G06F 3/03543 |
| 2004/0135825 A1* | 7/2004 | Brosnan | ..................... | G06F 3/0317 715/857 |
| 2005/0139944 A1* | 6/2005 | Lin | ..................... | G06F 3/03543 257/432 |
| 2006/0132443 A1* | 6/2006 | Chien Wu | ..................... | G06F 3/0317 345/166 |
| 2007/0273653 A1* | 11/2007 | Chen | ..................... | G06F 3/1415 345/166 |
| 2009/0195503 A1* | 8/2009 | Lee | ..................... | G06F 3/0317 345/166 |
| 2011/0310018 A1* | 12/2011 | Song | ..................... | G06F 3/0312 345/166 |
| 2012/0038554 A1* | 2/2012 | Wu | ..................... | G06F 3/038 348/135 |
| 2015/0009146 A1* | 1/2015 | Song | ..................... | G06F 3/0317 345/166 |
| 2020/0097099 A1* | 3/2020 | Lim | ..................... | G06F 1/3259 |

* cited by examiner

*Primary Examiner* — Dorothy Harris
(74) *Attorney, Agent, or Firm* — Winston Hsu

(57) ABSTRACT

An optical navigation method includes: providing an optical sensor to operate in a run mode to sense pixel images to perform a displacement calculation; performing a low feature detection upon the sensed pixel images; and, controlling the optical sensor switching from the run mode into a rest mode in which the optical sensor does not perform the displacement calculation when the low feature detection indicates a low feature condition result.

16 Claims, 5 Drawing Sheets

OPTICAL NAVIGATION DEVICE AND METHOD CAPABLE OF ACCURATELY AVOIDING STATIONARY CURSOR JITTER NOISE

BACKGROUND OF THE INVENTION

1. Field of the Invention

The invention relates to an optical navigation mechanism, and more particularly to an optical navigation device and a corresponding method.

2. Description of the Prior Art

Generally speaking, a conventional optical navigation device needs to calculate the displacement data or detect the motion data when it is in a run mode. When the number of detected feature points is below a minimum feature threshold, the displacement data will not be calculated by the conventional optical navigation device. However, if the number of detected feature points is above the minimum feature threshold but the conventional optical navigation device operates in a low feature condition, wrong displacement data may be caused and generated due to the low signal-to-noise ratio of the low feature condition and thus unwanted motion data will be calculated and generated.

SUMMARY OF THE INVENTION

Therefore one of the objectives of the invention is to provide a novel optical navigation device and corresponding method, to solve the above-mentioned problems.

According to the embodiments, an optical navigation device is disclosed. An optical navigation device comprises an optical sensor, a detection circuit, and a control circuit. The optical sensor is configured to operate in a run mode to sense pixel images to perform a displacement calculation. The detection circuit is coupled to the optical sensor, and it is configured to perform a low feature detection upon the sensed pixel images. The control circuit is coupled to the detection circuit and is configured to control the optical sensor switching from the run mode into a rest mode in which the optical sensor does not perform the displacement calculation when the low feature detection indicates a low feature condition result.

According to the embodiments, an optical navigation method of an optical navigation device is disclosed. The optical navigation method comprises: providing an optical sensor to operate in a run mode to sense pixel images to perform a displacement calculation; performing a low feature detection upon the sensed pixel images; and, controlling the optical sensor switching from the run mode into a rest mode in which the optical sensor does not perform the displacement calculation when the low feature detection indicates a low feature condition result.

These and other objectives of the present invention will no doubt become obvious to those of ordinary skill in the art after reading the following detailed description of the preferred embodiment that is illustrated in the various figures and drawings.

DETAILED DESCRIPTION

The invention aims at providing a technical solution of an optical navigation device and method capable of performing/executing a low feature detection upon pixel images/values of sensed/monitoring frames to more accurately detect displacement data so as to avoid the report of erroneous/false displacement data.

Figure 1:
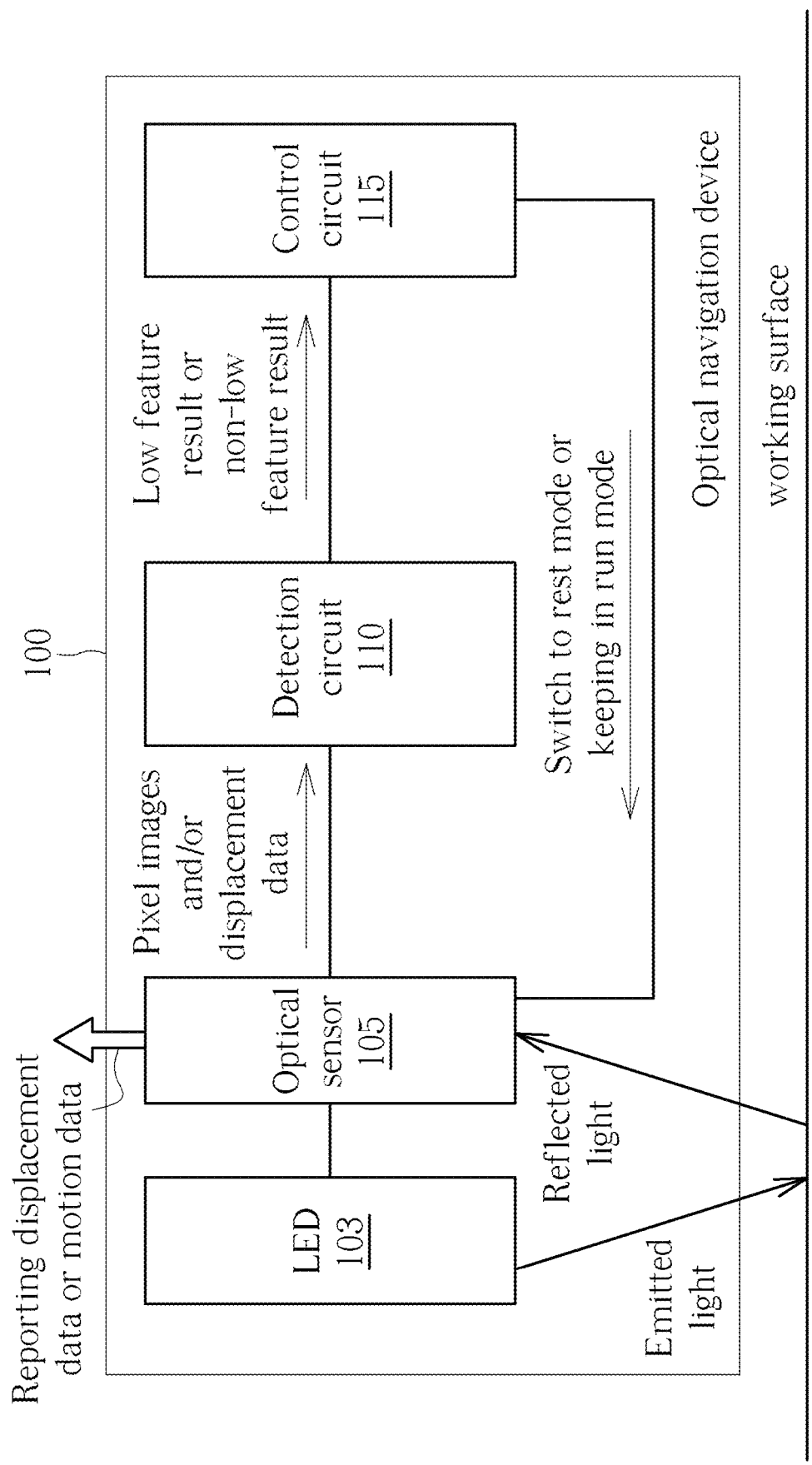
FIG. 1 is a block diagram of an optical navigation device according to an embodiment of the invention.
Figure 2:
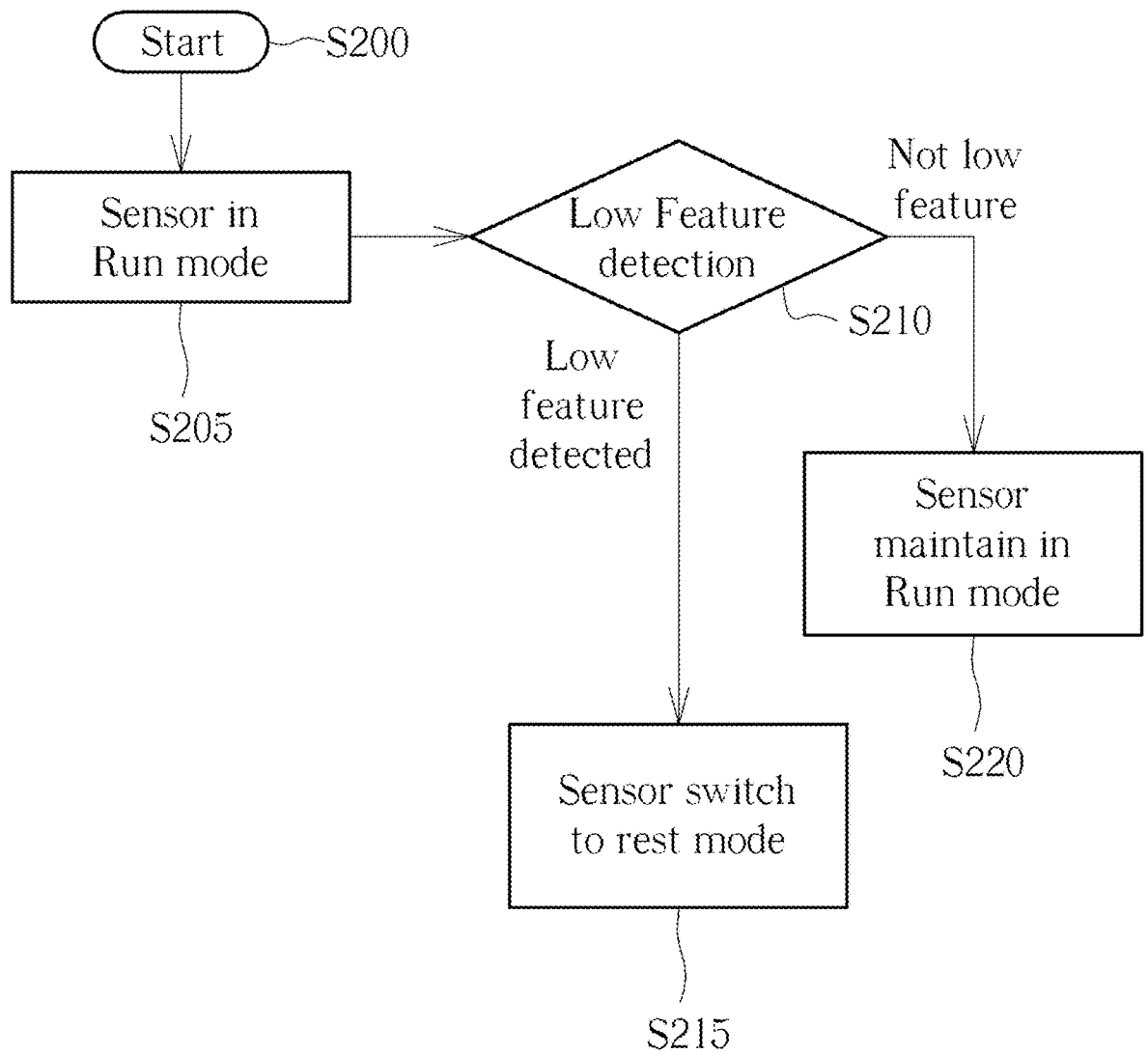
FIG. 2 is a flowchart diagram of the operation of the optical navigation device according to an embodiment of the invention.

Refer to FIG. 1 in conjunction with FIG. 2. FIG. 1 is a block diagram of an optical navigation device 100 according to an embodiment of the invention. FIG. 2 is a flowchart diagram of the operation of the optical navigation device 100 according to an embodiment of the invention. In FIG. 1, the optical navigation device 100 for example (but not limited) is an optical mouse device which may comprise a light emitting circuit such as a light emitting diode (LED) 103, an optical sensor 105, a detection circuit 110, and a control circuit 115. In other embodiments, the optical navigation device 100 may be an optical tracking device applied for different applications such as a printer device or other different electronic devices.

The optical navigation device 100 comprises a run mode and a rest mode. For example (but not limited), initially in a default setting the optical navigation device 100 may enter the run mode (Step S200) when it detects that a user may normally operate the optical navigation device 100 or the optical navigation device 100 is enabled. In the run mode (Step S205), the LED 103 is arranged to emit light onto the working surface on which the optical navigation device 100 is placed, and the optical sensor 105 is configured to operate in the run mode to receive reflected light to generate and sense pixel images to perform a displacement calculation. Alternatively, in other different applications, the LED 103 may be excluded by the optical navigation device 100, and in this situation the optical sensor 105 may receive reflected light of ambient light to generate and sense pixel images to perform the displacement calculation. This modification also obeys the spirits of the invention. In the run mode, the optical sensor 105 may report the displacement data of the executed displacement calculation to a computer device (not shown in FIG. 1), wherein the displacement data may be a difference value for the position tracking or an absolute value for the position tracking. In addition, in the run mode, the optical sensor 105 is arranged to output and transmit the currently sensed pixel images of one or more frames into the detection circuit 110.

The detection circuit 110 is coupled to the optical sensor 105 and is configured to perform the low feature detection upon the sensed pixel images outputted from the optical sensor 105. In Step S210, the detection circuit 110 is used to determine whether the sensed pixel images are associated with a low feature condition or not by performing the low feature detection. If the sensed pixel images are not associated with a low feature surface, the detection circuit 110 outputs a non-low feature condition result into the control circuit 115, and then in Step S220 the control circuit 115 is arranged to maintain/keep the optical sensor 105 in the run mode (i.e. not switching to the rest mode). Alternatively, if the sensed pixel images are associated with a low feature surface, the detection circuit 110 outputs a low feature condition result into the control circuit 115, and then in Step S215 the control circuit 115 is arranged to control the optical sensor 105 switching from the run mode into the rest mode. It should be noted that, when the optical sensor 105 switches into and enters the rest mode, the optical sensor 105 does not perform the displacement calculation, i.e. no displacement data will be outputted to the computer device.

Figure 3:
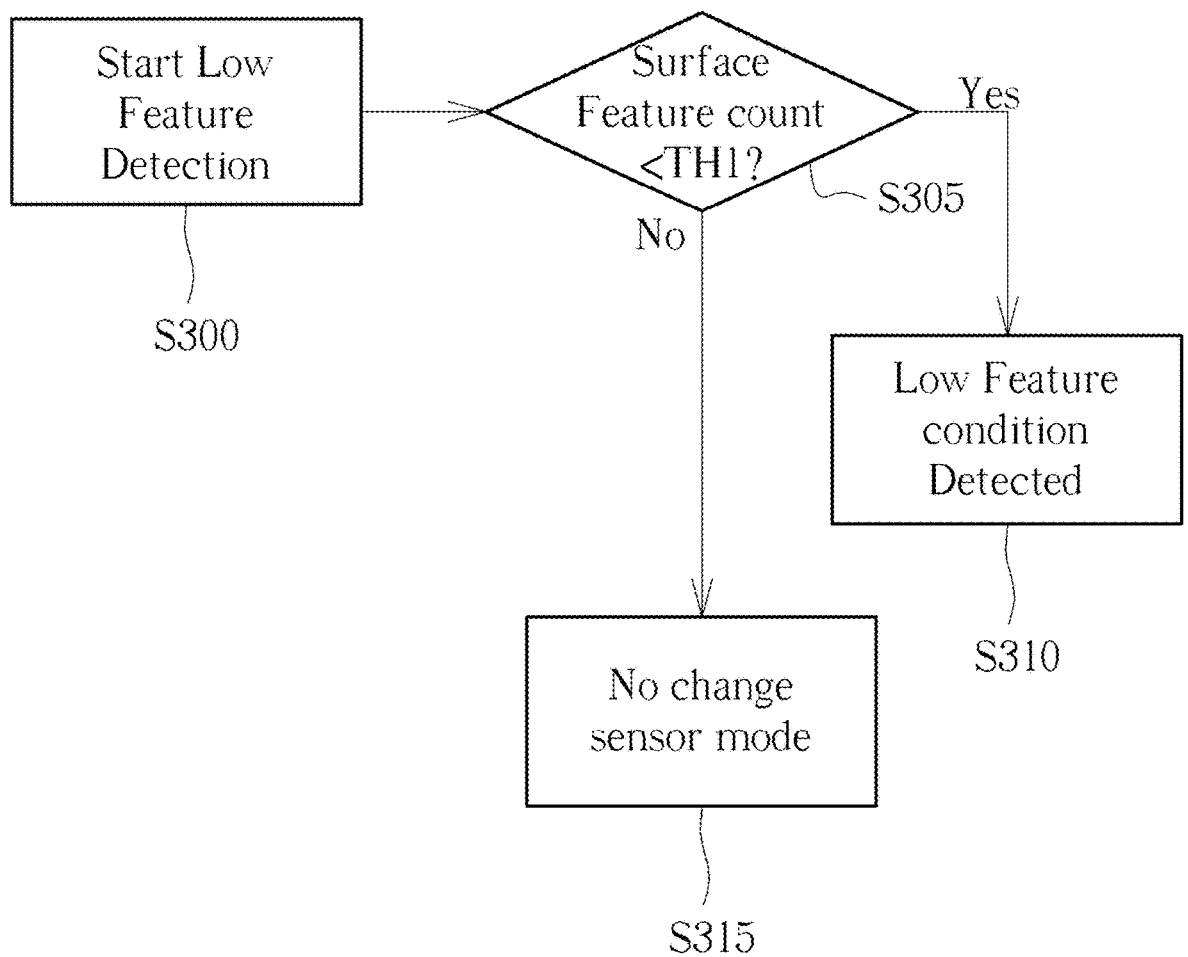
FIG. 3 is a flowchart diagram of the operations of the detection circuit executing the low feature detection according to an embodiment of the invention.

FIG. 3 is a flowchart diagram of the operations of the detection circuit 115 executing the low feature detection according to an embodiment of the invention. In Step S300, when receiving the sensed pixel images from the optical sensor 105, the detection circuit 115 starts and executes the low feature detection upon the sensed pixel images. In this embodiment, in practice, the detection circuit 115 executes a feature extraction engine to extract the texture features from the sensed pixel images and counts the number of total texture features to generate/calculate a surface feature count, i.e. the feature count of the sensed pixel images. Then, the detection circuit 115 may compare the surface feature count with a specific threshold TH1 (i.e. a low feature count threshold) and compare the surface feature count with a minimum feature count threshold, as shown in Step S305. If the surface feature count is smaller than the specific threshold TH1 and is larger than the minimum feature count threshold (i.e. the surface feature count is between the threshold TH1 and the minimum feature count threshold), the detection circuit 115 determines that the surface feature count corresponds to a low feature condition (or may be called as a low surface feature condition) and generates and outputs the low feature condition result into the control circuit 115 (Step S310). If the surface feature count is not smaller than the specific threshold TH1 and is larger than the minimum feature count threshold, the detection circuit 115 determines that the surface feature count corresponds to a non-low feature condition (or may be called as a non-low surface feature condition) and generates and outputs the non-low feature condition result into the control circuit 115 (Step S315), and thus in this situation the control circuit 115 controls the optical sensor 105 not switching from the run mode into the rest mode, i.e. not changing the sensor mode.

Figure 4:
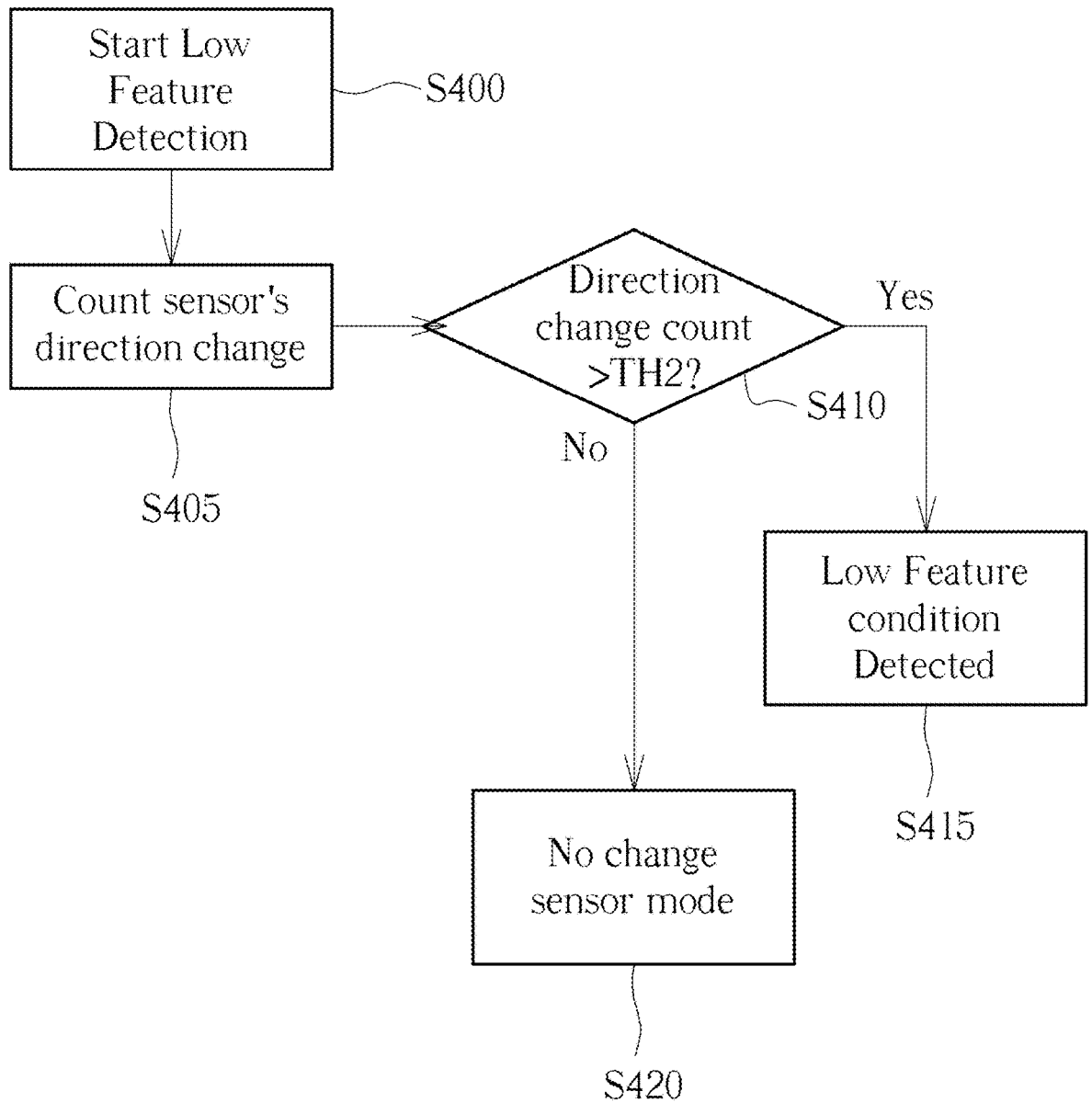
FIG. 4 is a flowchart diagram of the operations of the detection circuit executing the low feature detection according to a different embodiment of the invention.

In other embodiments, the detection circuit 115 may detect the direction change of the generated displacement data (i.e. directions of motions occurring in the sensed pixel images) to execute and achieve the low feature detection. FIG. 4 is a flowchart diagram of the operations of the detection circuit 115 executing the low feature detection according to a different embodiment of the invention. In Step S400, when receiving the sensed pixel images from the optical sensor 105, the detection circuit 115 starts and executes the low feature detection to receive the displacement/motion data reported by the optical sensor 105. In this embodiment, in practice, the detection circuit 115 does not execute the above-mentioned feature extraction engine and is arranged to receive the displacement data generated/reported from the optical sensor 105 so as to count the number of direction change of multiple displacement data contiguously generated by the optical sensor 105 to calculate and obtain a direction change count (Step S405), without counting the number of total texture features of the sensed pixel images. Then, the detection circuit 115 may compare the direction change count with a second threshold TH2 (i.e. a specific direction threshold) and compare the surface feature count with the minimum feature count threshold, as shown in Step S410. In other embodiments, the detection circuit 110 may determine that the low feature detection indicates the low feature condition result when a continuous direction switching of the motions occurs in the sensed pixel images.

It should be noted that, ideally, when a user operates the optical navigation device 100 for example being used as an optical mouse device, the displacement/motion data periodically reported by the optical navigation device 100 into a computer device will not frequently change the motion direction since the user rarely vibrates the optical navigation device 100 by himself/herself. Thus, if the direction change count accumulated during a specific time interval is larger than the second threshold TH2 and the accumulated surface feature count is between the minimum feature count threshold and the low feature count threshold TH1, the detection circuit 115 can determine that an abnormal condition such as a low surface feature condition occurs and thus can determine that the surface feature count corresponds to a low feature condition (e.g. the low surface feature condition) and generates and outputs the low feature condition result into the control circuit 115 (Step S415). Alternatively, if the surface feature count accumulated during the specific time interval is not smaller than the second threshold TH2, the detection circuit 115 can determine that no abnormal conditions occur and can determine that the surface feature count corresponds to a non-low feature condition (or may be called as a non-low surface feature condition) and generates and outputs the non-low feature condition result into the control circuit 115 (Step S420), and thus in this situation the control circuit 115 controls the optical sensor 105 not switching from the run mode into the rest mode, i.e. not changing the sensor mode.

Further, in one example, the detection circuit 110 may determine that the low feature detection does not indicate the low feature condition result when the change number of the directions of the motions during the specific time interval is greater than the specific direction threshold TH2 and the accumulated feature count is not between the minimum feature count threshold and the low feature count threshold TH1. Further, in another example, the detection circuit 110 may determine that the low feature detection indicates the low feature condition result when the change number of the directions of the motions during the specific time interval is not greater than the specific direction threshold TH2 and the accumulated feature count is between the minimum feature count threshold and the low feature count threshold TH1.

Further, in one embodiment, the detection circuit 110 is arranged to perform the low feature detection by calculating a hysteresis value (e.g. the average of multiple values) of feature counts of the sensed pixel images during the specific time interval, comparing the hysteresis value of the feature counts with the minimum feature count threshold, and by comparing the hysteresis value of the feature counts with the low feature count threshold TH1. This also obeys the spirits of the invention.

Figure 5:
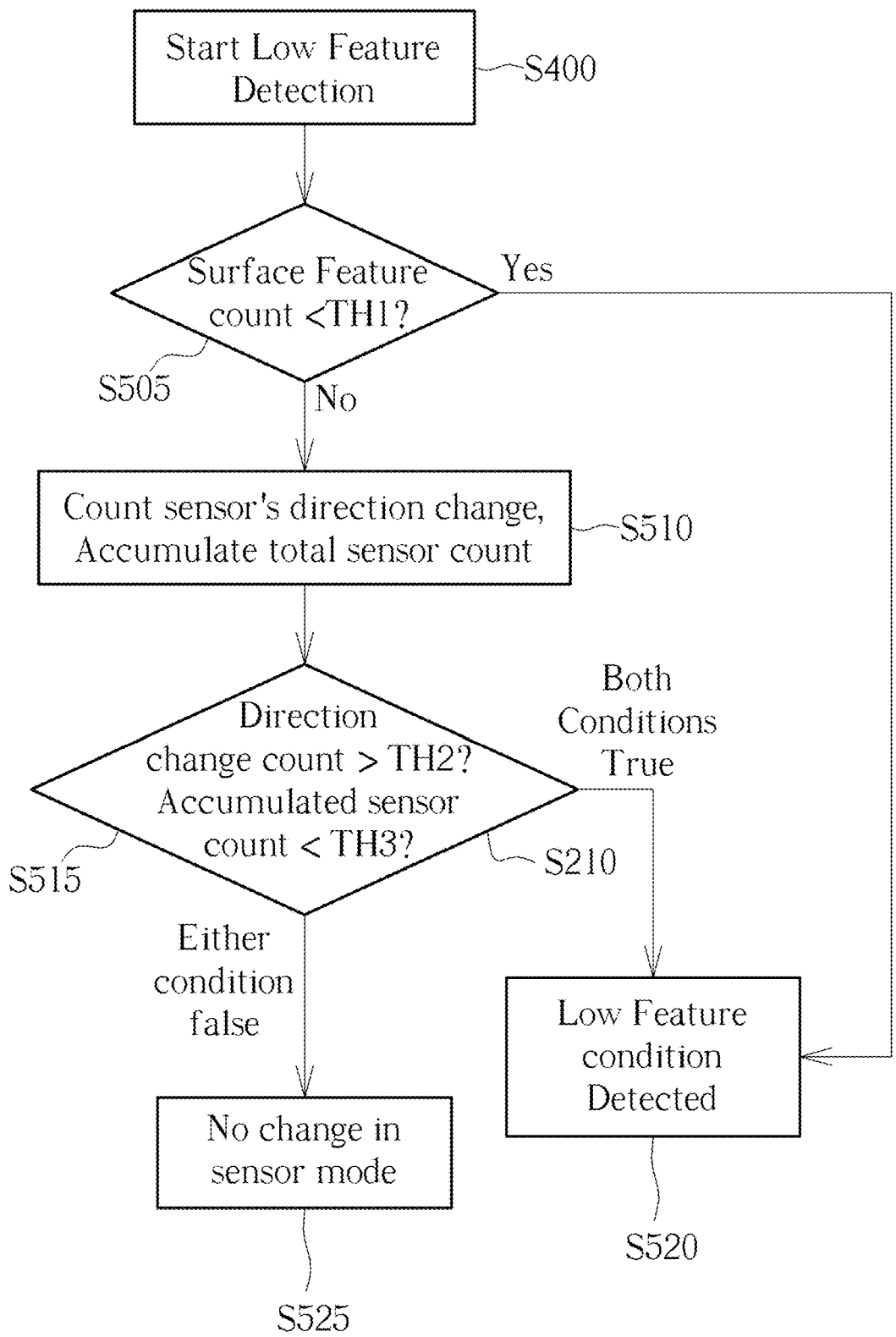
FIG. 5 is a flowchart diagram of the operations of the detection circuit executing the low feature detection according to another different embodiment of the invention.

Further, in other embodiments, the length of the above-mentioned specific time interval may be adjustable and flexible, and also can be replaced by other operations. FIG. 5 is a flowchart diagram of the operations of the detection circuit 115 executing the low feature detection according to another different embodiment of the invention. In Step S500, when receiving the sensed pixel images from the optical sensor 105, the detection circuit 115 starts and executes the low feature detection to execute the operations of feature extract engine and also to receive the displacement/motion data reported by the optical sensor 105. In practice, the detection circuit 115 executes the feature extraction engine to extract the texture features from the sensed pixel images and counts the number of total texture features to generate/calculate a surface feature count. Then, the detection circuit 115 may compare the surface feature count with a specific threshold TH1, as shown in Step S505. If the surface feature count is smaller than the specific threshold TH1, the detection circuit 115 can determine that the surface feature count corresponds to a low feature condition (or may be called as a low surface feature condition) and generates and outputs the low feature condition result into the control circuit 115 (Step S505). If the surface feature count is not smaller than the specific threshold TH1, the flow proceeds to Step S510.

In Step S510, the detection circuit 115 counts the number of direction change of multiple displacement data contiguously generated by the optical sensor 105 to calculate and obtain a direction change count, and also the detection circuit 115 counts and accumulates the number of the multiple displacement data contiguously generated by the optical sensor 105 to calculate and obtain a total sensor count. Then, in Step S515, the detection circuit 115 compares the direction change count with the second threshold TH2 to determine whether a first condition that the direction change count is larger than the second threshold TH2 is satisfied or not and also compares the accumulated total sensor count with a third threshold TH3 to determine whether a second condition that the accumulated total sensor count is smaller than the third threshold TH3 is satisfied or not.

If both of the first and second conditions are satisfied, i.e. the direction change count is larger than the second threshold TH2 and the accumulated total sensor count is smaller than the third threshold TH3, the detection circuit 110 can determine that an abnormal condition such as a low surface feature condition occurs and thus can determine that the surface feature count corresponds to a low feature condition (e.g. the low surface feature condition) and generates and outputs the low feature condition result into the control circuit 115 (Step S520).

Alternatively, if either the first condition or second condition is false, i.e. one or two conditions are not satisfied, the detection circuit 115 can determine that no abnormal conditions occur and can determine that the surface feature count corresponds to a non-low feature condition (or may be called as a non-low surface feature condition) and generates and outputs the non-low feature condition result into the control circuit 115 (Step S525), and thus in this situation the control circuit 115 controls the optical sensor 105 not switching from the run mode into the rest mode, i.e. not changing the sensor mode. The value of third threshold TH3 is configured to be greater than that of the second threshold TH2; however, this is not intended to be a limitation. Further, for example (but not limited), the detection circuit 110 may determine that a low feature condition occurs when the direction change count becomes larger than the second threshold TH2 before the accumulated total sensor count is still smaller than the third threshold TH3 and does not yet arrive at the third threshold TH3.

By doing so, the optical navigation device 100 can effectively eliminate the stationary cursor jitter when the optical navigation device 100 is in a static state and/or in a low feature condition. The invention proposes changing an optical sensor's operating condition when a low feature condition is detected. For example, when a low feature condition is detected, the operating condition will be changed from the run mode into the rest mode. When the optical sensor is in the rest mode, no displacement calculation will be performed. Instead, the optical sensor will perform the wake up check operation. The wakeup check operation is a test that only checks for a change in image properties. That is, if the number of image property changes exceeds a predefined threshold, the optical sensor will go back to the run mode. Further, in the rest mode, since there is no displacement calculation, there will be no unwanted motion.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical navigation device, comprising:
    an optical sensor, configured to operate in a run mode to sense pixel images to perform a displacement calculation;
    a detection circuit, coupled to the optical sensor, configured to perform a low feature detection upon the sensed pixel images by detecting directions of motions occurring in the sensed pixel images; and
    a control circuit, coupled to the detection circuit, configured to control the optical sensor switching from the run mode into a rest mode in which the optical sensor does not perform the displacement calculation when the low feature detection indicates a low feature condition result.

2. The optical navigation device of claim 1, wherein the detection circuit is arranged to perform the low feature detection by comparing a feature count of the sensed pixel images with a minimum feature count threshold and by comparing the feature count with a low feature count threshold.

3. The optical navigation device of claim 2, wherein the detection circuit determines that the low feature detection indicates the low feature condition result when the feature count is between the minimum feature count threshold and the low feature count threshold.

4. The optical navigation device of claim 1, wherein the detection circuit determines that the low feature detection indicates the low feature condition result when a continuous direction switching of the motions occurs in the sensed pixel images.

5. The optical navigation device of claim 1, wherein the detection circuit determines that the low feature detection indicates the low feature condition result when a change number of the directions of the motions during a specific time interval is greater than a specific direction threshold and an accumulated feature count is between the minimum feature count threshold and the low feature count threshold.

6. The optical navigation device of claim 1, wherein the detection circuit determines that the low feature detection does not indicate the low feature condition result when a change number of the directions of the motions during a specific time interval is greater than a specific direction threshold and an accumulated feature count is not between the minimum feature count threshold and the low feature count threshold.

7. The optical navigation device of claim 1, wherein the detection circuit determines that the low feature detection indicates the low feature condition result when a change number of the directions of the motions during a specific time interval is not greater than a specific direction threshold and an accumulated feature count is between the minimum feature count threshold and the low feature count threshold.

8. The optical navigation device of claim 1, wherein the detection circuit is arranged to perform the low feature detection by calculating a hysteresis value of feature counts of the sensed pixel images during a specific time interval, comparing the hysteresis value of the feature counts with a minimum feature count threshold, and by comparing the hysteresis value of the feature counts with a low feature count threshold.

9. An optical navigation method of an optical navigation device, comprising:
    providing an optical sensor to operate in a run mode to sense pixel images to perform a displacement calculation;
    performing a low feature detection upon the sensed pixel images by detecting directions of motions occurring in the sensed pixel images; and
    controlling the optical sensor switching from the run mode into a rest mode in which the optical sensor does not perform the displacement calculation when the low feature detection indicates a low feature condition result.

10. The optical navigation method of claim 9, further comprising:
    performing the low feature detection by comparing a feature count of the sensed pixel images with a minimum feature count threshold and by comparing the feature count with a low feature count threshold.

11. The optical navigation method of claim 10, further comprising:
    determining that the low feature detection indicates the low feature condition result when the feature count is between the minimum feature count threshold and the low feature count threshold.

12. The optical navigation method of claim 9, further comprising:
    determining that the low feature detection indicates the low feature condition result when a continuous direction switching of the motions occurs in the sensed pixel images.

13. The optical navigation method of claim 9, further comprising:
    determining that the low feature detection indicates the low feature condition result when a change number of the directions of the motions during a specific time interval is greater than a specific direction threshold and an accumulated feature count is between the minimum feature count threshold and the low feature count threshold.

14. The optical navigation method of claim 9, further comprising:
    determining that the low feature detection does not indicate the low feature condition result when a change number of the directions of the motions during a specific time interval is greater than a specific direction threshold and an accumulated feature count is not between the minimum feature count threshold and the low feature count threshold.

15. The optical navigation method of claim 9, further comprising:
    determining that the low feature detection indicates the low feature condition result when a change number of the directions of the motions during a specific time interval is not greater than a specific direction threshold and an accumulated feature count is between the minimum feature count threshold and the low feature count threshold.

16. The optical navigation method of claim 9, further comprising:
    performing the low feature detection by calculating a hysteresis value of feature counts of the sensed pixel images during a specific time interval, comparing the hysteresis value of the feature counts with a minimum feature count threshold, and by comparing the hysteresis value of the feature counts with a low feature count threshold.

* * * * *